US012575604B2

(12) United States Patent
Li et al.

(10) Patent No.: US 12,575,604 B2
(45) Date of Patent: Mar. 17, 2026

(54) SMOKING SET CONTROL CIRCUIT AND SMOKING SET

(71) Applicant: SHENZHEN FIRST UNION TECHNOLOGY CO., LTD., Shenzhen (CN)

(72) Inventors: Wenjuan Li, Shenzhen (CN); Xiaogang Fang, Shenzhen (CN); Peixia Yu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 838 days.

(21) Appl. No.: 17/792,135

(22) PCT Filed: Jan. 10, 2021

(86) PCT No.: PCT/CN2021/070999
§ 371 (c)(1),
(2) Date: Jul. 11, 2022

(87) PCT Pub. No.: WO2021/139804
PCT Pub. Date: Jul. 15, 2021

(65) Prior Publication Data
US 2023/0086478 A1      Mar. 23, 2023

(30) Foreign Application Priority Data
Jan. 11, 2020    (CN) .......................... 202020062619.6

(51) Int. Cl.
*A24F 40/40*          (2020.01)
*A24F 40/57*          (2020.01)
(Continued)

(52) U.S. Cl.
CPC .............. *A24F 40/40* (2020.01); *A24F 40/57* (2020.01); *H02J 7/855* (2026.01);
(Continued)

(58) Field of Classification Search
None
See application file for complete search history.

(56) References Cited

U.S. PATENT DOCUMENTS 4,814,687 A * 3/1989 Walker .................... G05F 1/565
                                                            323/275
7,412,612 B2 * 8/2008 Maple ................. H02M 3/1588
                                                            713/340
(Continued)

FOREIGN PATENT DOCUMENTS

CN          102541232 A          7/2012
CN          204258628 U          4/2015
(Continued)

*Primary Examiner* — Crystal L Hammond
*Assistant Examiner* — Jennifer C Caulk
(74) *Attorney, Agent, or Firm* — Scully, Scott, Murphy & Presser, P.C.

(57)          ABSTRACT
A smoking set control circuit for a smoking set includes: a power circuit first and second sampling circuits; a voltage regulating circuit having power tubes; a microcontroller configured to: control the power tubes to work at a plurality of different preset switching frequencies; acquire first electrical parameters and second electrical parameters at different preset switching frequencies, and accordingly determine corresponding efficiencies of the voltage regulating circuit at different preset switching frequencies; control the power tube to take the preset switching frequency corresponding to the highest efficiency among the corresponding efficiencies as the working frequency. A loss of the voltage regulating circuit is reduced and a utilization rate of power supply is improved by acquiring the electrical parameters at different preset switching frequencies, determining corresponding (Continued)

efficiencies of the voltage regulating circuit, and controlling the power tube to take the preset switching frequency corresponding to the highest efficiency as the working frequency.

11 Claims, 7 Drawing Sheets

(51) Int. Cl.

| | | |
|---|---|---|
| *H02J 7/00* | (2006.01) | |
| *H02M 1/00* | (2007.01) | |
| *H02M 3/156* | (2006.01) | |
| *H02J 105/44* | (2026.01) | |

(52) U.S. Cl.
 CPC ......... *H02M 1/0054* (2021.05); *H02M 3/156* (2013.01); *H02J 2105/44* (2026.01); *H02J 2207/20* (2020.01)

(56) References Cited

U.S. PATENT DOCUMENTS

| | | | | |
|---|---|---|---|---|
| 10,788,523 | B1 * | 9/2020 | Michal | H02M 3/1582 |
| 11,165,328 | B2 * | 11/2021 | Young | H02M 7/153 |
| 2011/0265806 | A1 * | 11/2011 | Alarcon | A24F 40/65 |
| | | | | 131/273 |
| 2012/0169314 | A1 | 7/2012 | Tong et al. | |
| 2015/0101625 | A1 | 4/2015 | Newton et al. | |
| 2019/0159523 | A1 * | 5/2019 | Qiu | A24F 40/40 |

FOREIGN PATENT DOCUMENTS

| | | | | | |
|---|---|---|---|---|---|
| CN | 206371515 | U | | 8/2017 | |
| CN | 208258102 | U | | 12/2018 | |
| CN | 110432546 | A | * | 11/2019 | H02J 50/00 |
| CN | 212279901 | U | | 1/2021 | |
| EP | 1569323 | A2 | | 8/2005 | |
| EP | 3569078 | A1 | | 11/2019 | |
| JP | 2014-35314 | A | | 2/2014 | |

* cited by examiner

SMOKING SET CONTROL CIRCUIT AND SMOKING SET

CROSS REFERENCE TO RELATED APPLICATIONS

The present application is a 35 U.S.C. § 371 National Phase conversion of International (PCT) Patent Application No. PCT/CN2021/070999, filed on Jan. 10, 2021, which claims priority to Chinese Patent Application No. 202020062619.6, filed with the Chinese Patent Office on Jan. 11, 2020, titled "SMOKING SET CONTROL CIR- CUIT AND SMOKING SET", the entire contents of which are incorporated herein by reference. The PCT International Patent Application was filed and published in Chinese.

TECHNICAL FIELD

The present application relates to the technical field of smoking sets, and in particular, relates to a smoking set control circuit and a smoking set.

BACKGROUND

Articles such as cigarettes and cigars burn tobacco to produce tobacco smoke during use. Attempts have been made to provide substitutes for these tobacco-burning articles by producing products that release compounds with- out burning. Examples of such products are so-called incom- bustible products which are incombustible when heated, and they are also known as tobacco-heating products or tobacco- heating equipment which release compounds by heating instead of burning materials. For example, the materials may be tobacco or other non-tobacco products or combinations thereof, such as blended mixtures that may or may not contain nicotine.

An existing smoking set which is incombustible when heated at a low temperature generally adopts a voltage regulating circuit composed of discrete devices (inductors, switch tubes, etc.). That is, when the load needs different power, the required voltage is acquired by the voltage regulating circuit composed of the discrete devices, and then provided to a heater in the smoking set for heating.

The problem of the above-mentioned voltage regulating circuit with discrete devices lies in that: the output voltage of the voltage regulating circuit is different when the heater needs different power, but the working frequency of the power tubes in the voltage regulating circuit is generally kept constant, which results in greater loss of the voltage regulating circuit and lower utilization rate of power supply.

SUMMARY

The present application provides a smoking set control circuit and a smoking set, which are intended to solve the problem in the existing smoking set that the loss of the voltage regulating circuit composed of discrete devices is great and the utilization rate of power supply is low.

A first aspect of the present application provides a smok- ing set control circuit which comprises a power circuit, and the smoking set control circuit further comprises a first sampling circuit, a voltage regulating circuit, a second sampling circuit and a microcontroller;

the first sampling circuit is configured to sample first electrical parameters at the front end of the voltage regulating circuit;

the voltage regulating circuit comprises power tubes;

the second sampling circuit is configured to sample sec- ond electrical parameters at the back end of the voltage regulating circuit;

the microcontroller is configured to:

control the power tubes to work at a plurality of different preset switching frequencies;

acquire the first electrical parameters and the second electrical parameters at different preset switching fre- quencies, and accordingly determine corresponding efficiencies of the voltage regulating circuit at different preset switching frequencies;

control the power tube to take the preset switching frequency corresponding to the highest efficiency among the corresponding efficiencies as the working frequency.

A second aspect of the present application provides a smoking set which comprises a heater and the smoking set control circuit described in the first aspect.

The smoking set control circuit and the smoking set provided according to the present application reduce the loss of the voltage regulating circuit and improve the utilization rate of power supply by acquiring the electrical parameters at different preset switching frequencies, and accordingly determining corresponding efficiencies of the voltage regu- lating circuit, and then controlling the power tube to take the preset switching frequency corresponding to the highest efficiency among the corresponding efficiencies as the work- ing frequency.

BRIEF DESCRIPTION OF THE DRAWINGS

One or more embodiments are illustrated by pictures in corresponding attached drawings, and this does not consti- tute limitation on the embodiments. Elements with the same reference numerals in the attached drawings are shown as similar elements, and the pictures in the attached drawings do not constitute scale limitation unless otherwise stated particularly.

DETAILED DESCRIPTION

In order to facilitate the understanding of the present application, the present application will be explained in more detail below with reference to the attached drawings and the detailed description. It shall be noted that, when an element is expressed as "fixed to" another element, it may be directly on another element, or there may be one or more intervening elements therebetween. When an element is expressed as "electrically connected" to another element, it may be electrically connected to another element directly, or there may be one or more intervening elements therebetween. Terms such as "up", "down", "left", "right", "inside", "outside" and other similar expressions used in this specification are for illustrative purposes only.

Unless otherwise defined, all technical and scientific terms used in this specification have the same meanings as commonly understood by those skilled in the art of the present application. In this specification, the terms used in the specification of the present application are only for the purpose of describing specific embodiments, and are not intended to limit the present application. The term "and/or" used in this specification comprises any and all combinations of one or more associated items listed.

Throughout this disclosure, the term "power tubes" is used interchangeably with "power transistors" or "power transistor," and the term "switch tubes" is used interchangeably with "switch" or "switches." Unless otherwise indicated, these expressions refer to the same circuit elements.

First Embodiment

Figure 1:
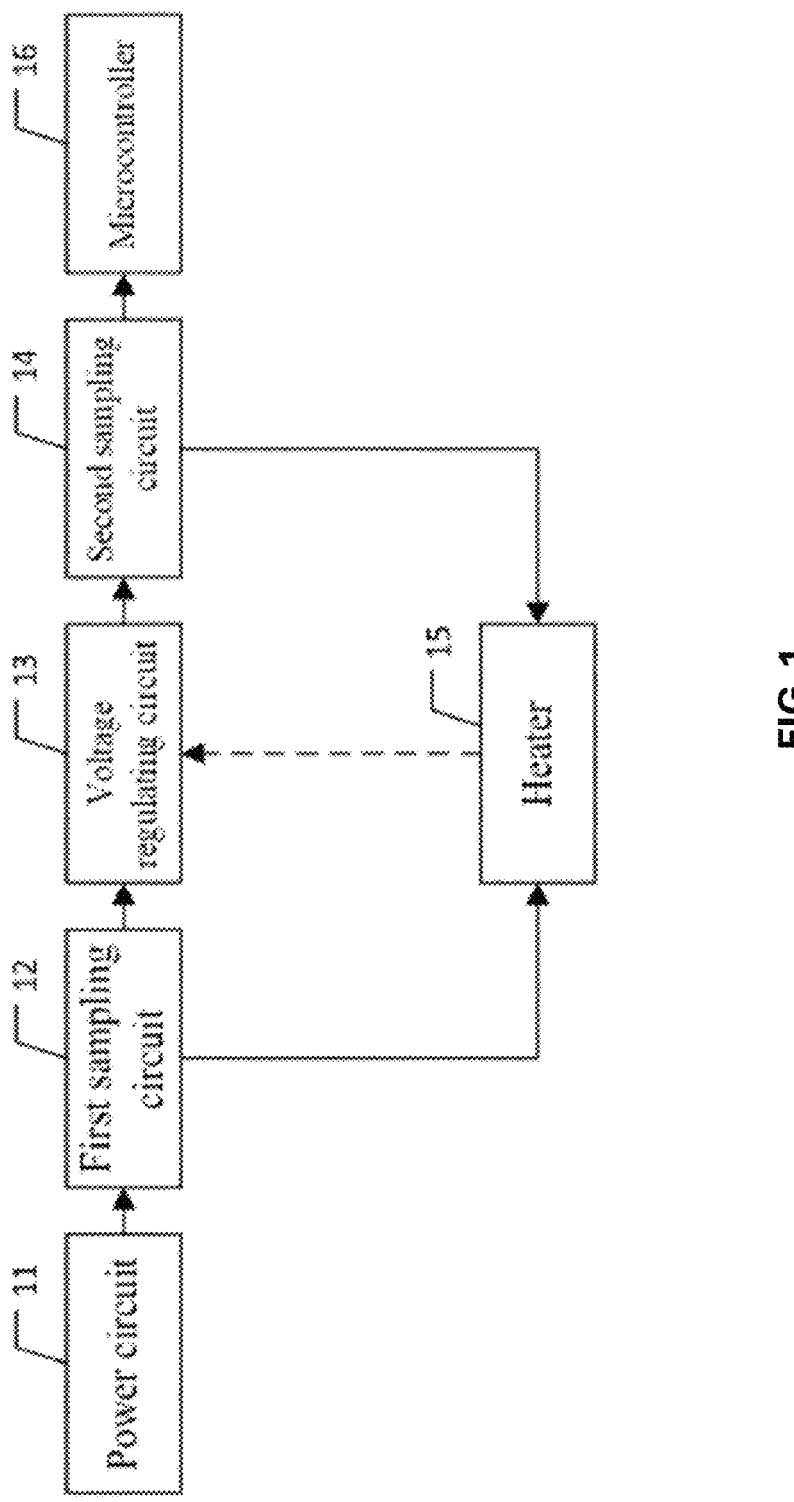
FIG. 1 is a schematic block diagram of a smoking set control circuit provided according to a first embodiment of the present application.

As shown in FIG. 1, a smoking set control circuit provided according to the first embodiment of the present application comprises a power circuit 11, a first sampling circuit 12, a voltage regulating circuit 13, a second sampling circuit 14, a microcontroller 15, and a temperature detection circuit 17.

The voltage regulating circuit 13 is provided with power tubes.

Figure 2:
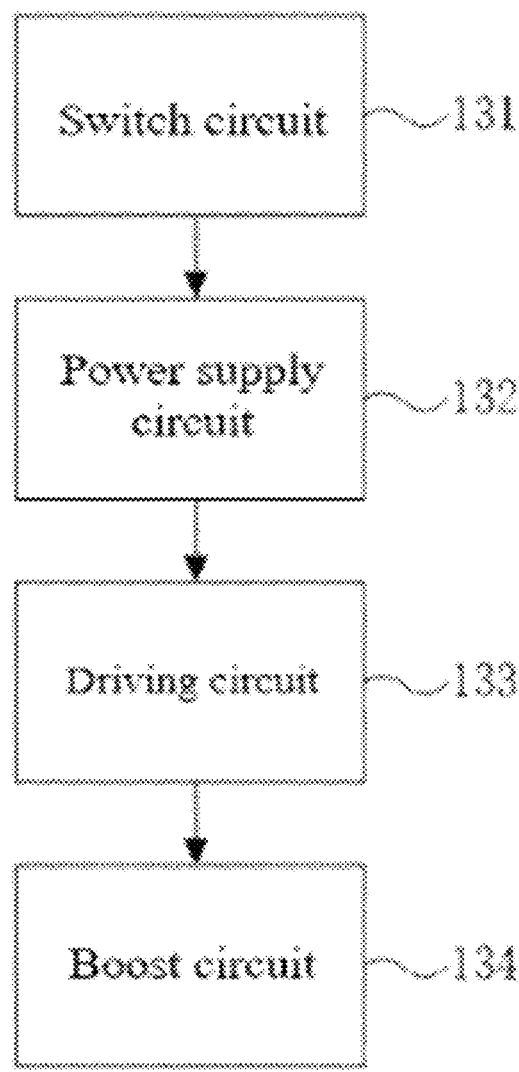
FIG. 2 is a schematic block diagram of a voltage regu- lating circuit in the smoking set control circuit provided according to the first embodiment of the present application.

Referring to FIG. 2, in this example, the voltage regulating circuit 13 comprises a switch circuit 131, a power supply circuit 132, a driving circuit 133 and a boost circuit 134;

the switch circuit 131 has an input terminal electrically connected with the power circuit 11, an output terminal electrically connected with a power input terminal of the power supply circuit 132, and a control terminal for receiving a second control signal output by the microcontroller 15; the second control signal is configured to controlling the on and off of the switch circuit 131;

the power supply circuit 132 has a power output terminal electrically connected with the driving circuit 133; the power supply circuit 132 is configured to supply power to the driving circuit 133;

the driving circuit 133 has a signal input terminal for receiving a driving signal provided by the microcontroller 15, and a signal output terminal which outputs a driving control signal for driving and controlling the power tubes in the boost circuit 134;

the boost circuit 134 is provided with power tubes; the boost circuit 134 has a power input terminal electrically connected with the power circuit 11, a power output terminal electrically connected with a heater 16, a signal receiving terminal for receiving the driving control signal output by the driving circuit 133, and a signal control terminal for receiving a third control signal output by the microcontroller 15; and the third control signal is configured to control the on and off of the boost circuit 134.

Figure 3:
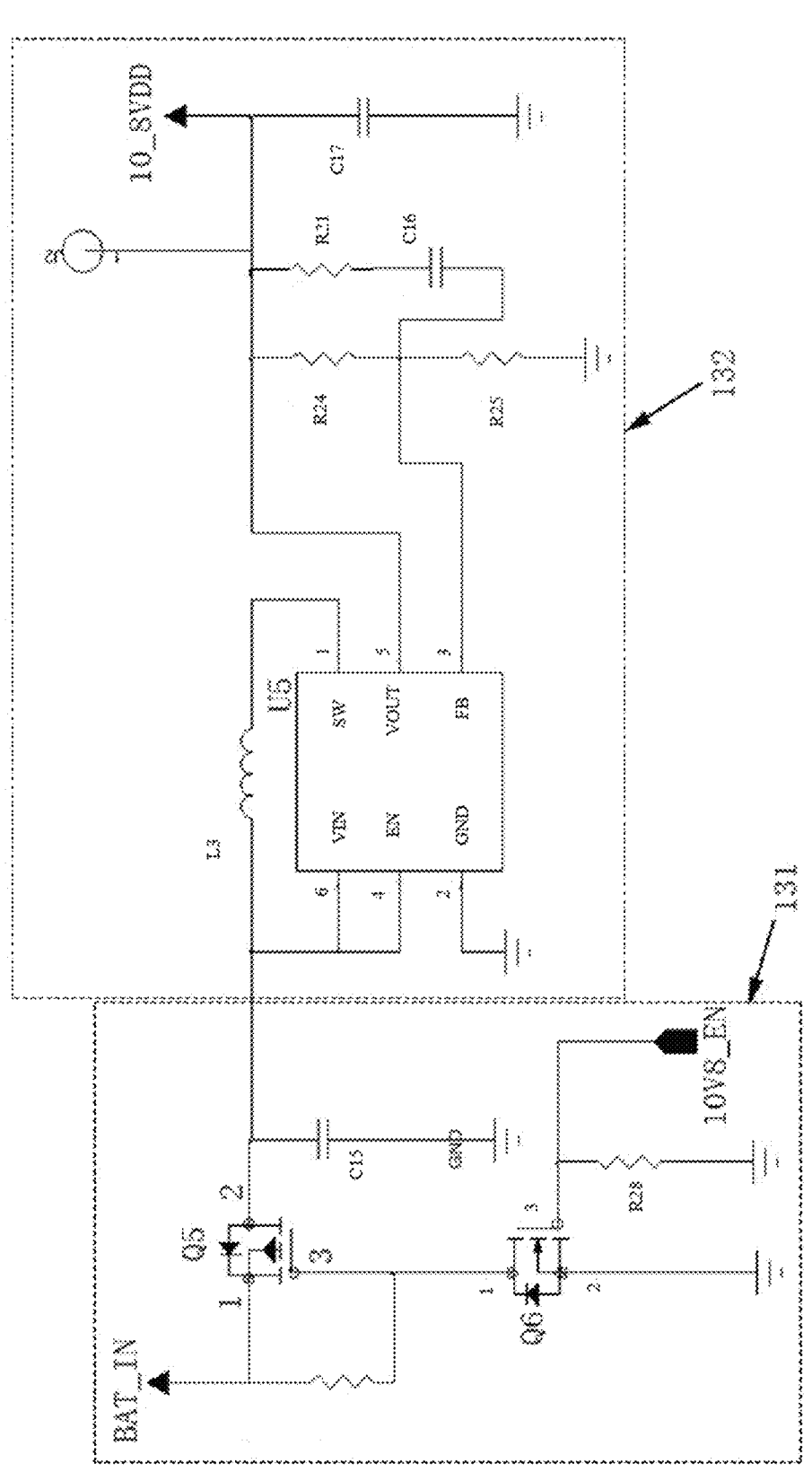
FIG. 3 is a schematic view of a switch circuit and a power supply circuit in the smoking set control circuit provided according to the first embodiment of the present application.
Figure 4:
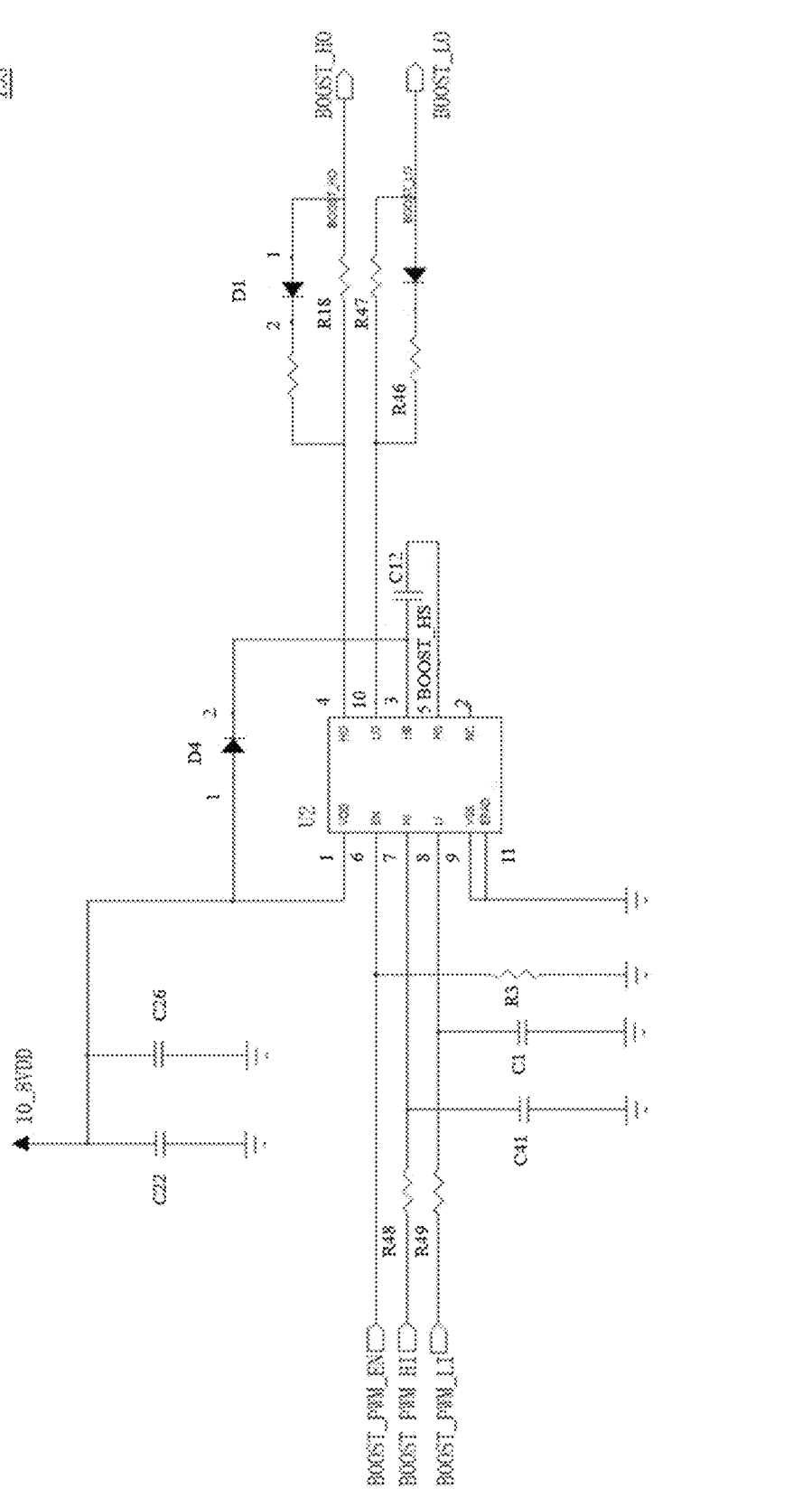
FIG. 4 is a schematic view of a driving circuit in the smoking set control circuit provided according to the first embodiment of the present application.
Figure 5:
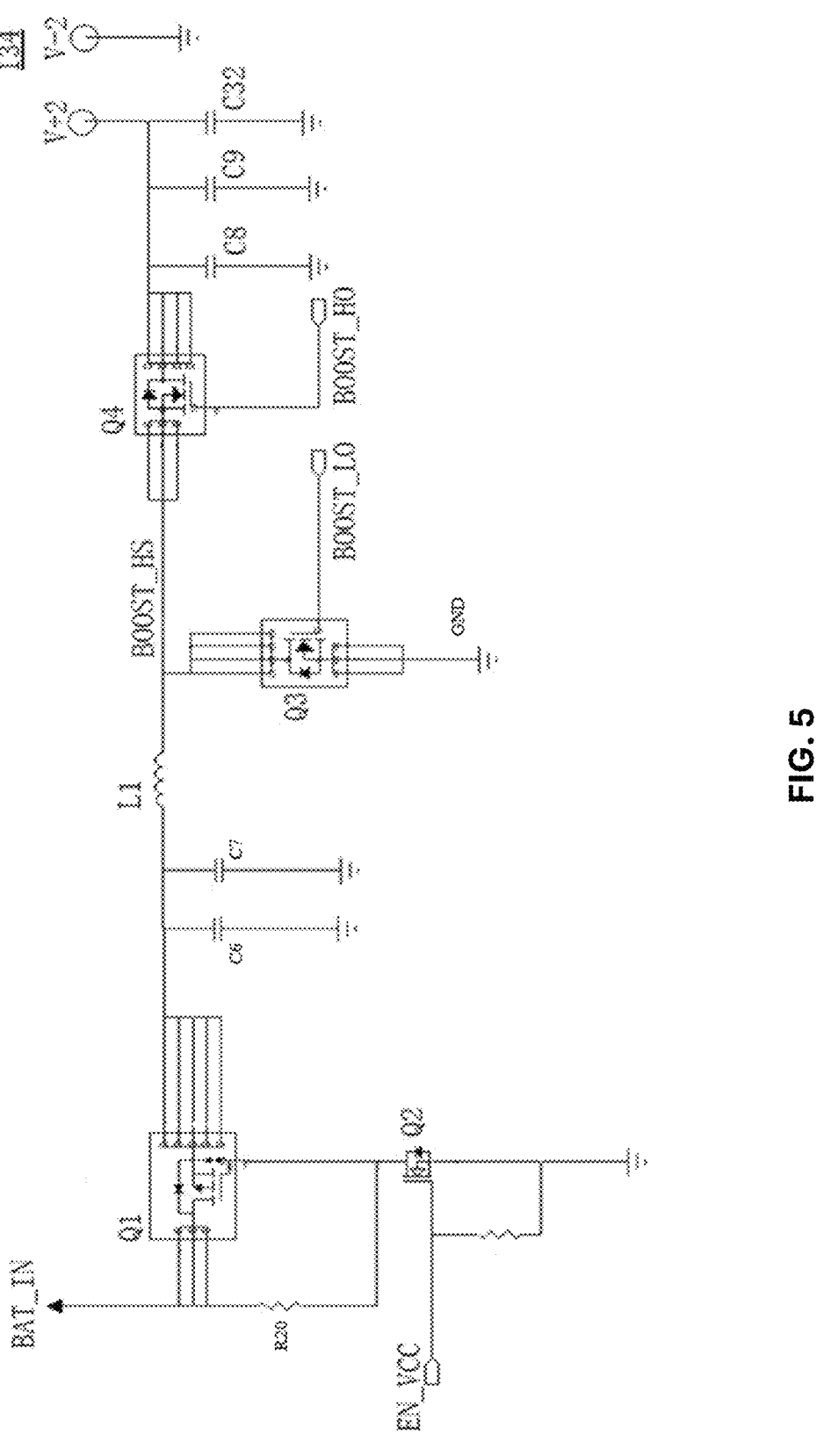
FIG. 5 is a schematic view of a boost circuit in the smoking set control circuit provided according to the first embodiment of the present application.

Referring to FIG. 3 to FIG. 5 for appreciation, in an example, the switch circuit 131 comprises a third switch tube Q5 and a fourth switch tube Q6;

the third switch tube Q5 has an input terminal electrically connected with the power circuit 11 (shown by BAT_IN in the figure), an output terminal electrically connected with pins (VIN, EN) of an integrated chip U5 in the power supply circuit 132, and a control terminal electrically connected with an input terminal of the fourth switch tube Q6;

the fourth switch tube Q6 has an output terminal grounded and a control terminal for receiving a control signal 10V8_EN output by the microcontroller 15; the control signal 10V8_EN is configured to control the on and off of the fourth switch tube Q6, thereby controlling the on and off of the third switch tube Q5.

In this example, the third switch tube Q5 is a PMOS transistor, and the fourth switch tube Q6 is an NMOS transistor.

The power supply circuit 132 comprises the integrated chip U5 and peripheral circuits thereof, and a pin VOUT of the integrated chip U5 is electrically connected with the driving circuit 133 after filtering (shown by 10_8VDD in the figure).

The driving circuit 133 comprises an integrated chip U2 and peripheral circuits thereof. A pin VDD of the integrated chip U2 is electrically connected with 10_8VDD, i.e., electrically connected with the pin VOUT of the integrated chip U5. The signal input pins EN, HI and LI of the integrated chip U2 are respectively configured to receive driving signals BOOST_PWM_EN, BOOST_PWM_HI and BOOST_PWM_LI provided by the microcontroller 15, and signal output pins HO and LO of the integrated chip U2 respectively output driving control signals BOOST_HO and BOOST_LO. The driving control signals BOOST_HO and BOOST_LO are configured to drive and control the power tubes in the boost circuit 134.

The boost circuit 134 comprises a first switch tube Q1, a second switch tube Q2, a charging circuit L1, a first power tube Q3 and a second power tube Q4;

the first switch tube Q1 has an input terminal electrically connected with the power circuit 11 (shown by BAT_IN in the figure) and an output terminal electrically connected to one end of the charging circuit L1, the other end of the charging circuit LI is electrically connected with an input terminal of the first power tube Q3 and an input terminal of the second power tube Q4, and a control terminal of the first switch tube Q1 is electrically connected with an input terminal of the second switch tube Q2;

the second switch tube Q2 has an output terminal grounded and a control terminal for receiving a control signal EN_VCC output by the microcontroller 15; and the control signal EN_VCC is configured to control the on and off of the second switch tube Q2, thereby controlling the on and off of the first switch tube Q1;

the first power tube Q3 has an output terminal grounded, and a control terminal for receiving the driving control signal BOOST_LO output by the integrated chip U2 in the driving circuit 133;

the second power tube Q4 has an output terminal electrically connected with the heater 16 (shown by V+2 and V−2 in the figure), and a control terminal for receiving the driving control signal BOOST_HO output by the integrated chip U2 in the driving circuit 133.

In this example, the charging circuit L1 is an inductor, the first switch tube Q1 is a PMOS transistor, and the second switch tube Q2, the first power tube Q3 and the second power tube Q4 are all NMOS transistors. The first power tube Q3 and the second power tube Q4 adopt high-power NMOS transistors, and the second switch tube Q2 adopts a low-power NMOS transistor. It shall be noted that, when the switching tube is an NMOS transistor, the drain of the NMOS transistor may be used as an input terminal, the source of the NMOS transistor may be used as an output terminal, and the gate of the NMOS transistor may be used as a control terminal. When the switch tube is a PMOS transistor, the source of the PMOS transistor may be used as an input terminal, the drain of the PMOS transistor may be used as an output terminal, and the gate of the PMOS transistor may be used as a control terminal. The same applies to the following description, and therefore, this will not be further described herein.

The boost circuit 134 further comprises a filter circuit (shown by C8, C9 and C32 in the figure) which is electrically connected between the output terminal of the second power tube Q4 and the heater 16.

The first sampling circuit 12 is used for sampling the first electrical parameters at the front end of the voltage regulating circuit 13; and the second sampling circuit 14 is used for sampling the second electrical parameters at the back end of the voltage regulating circuit 13.

Figure 6:
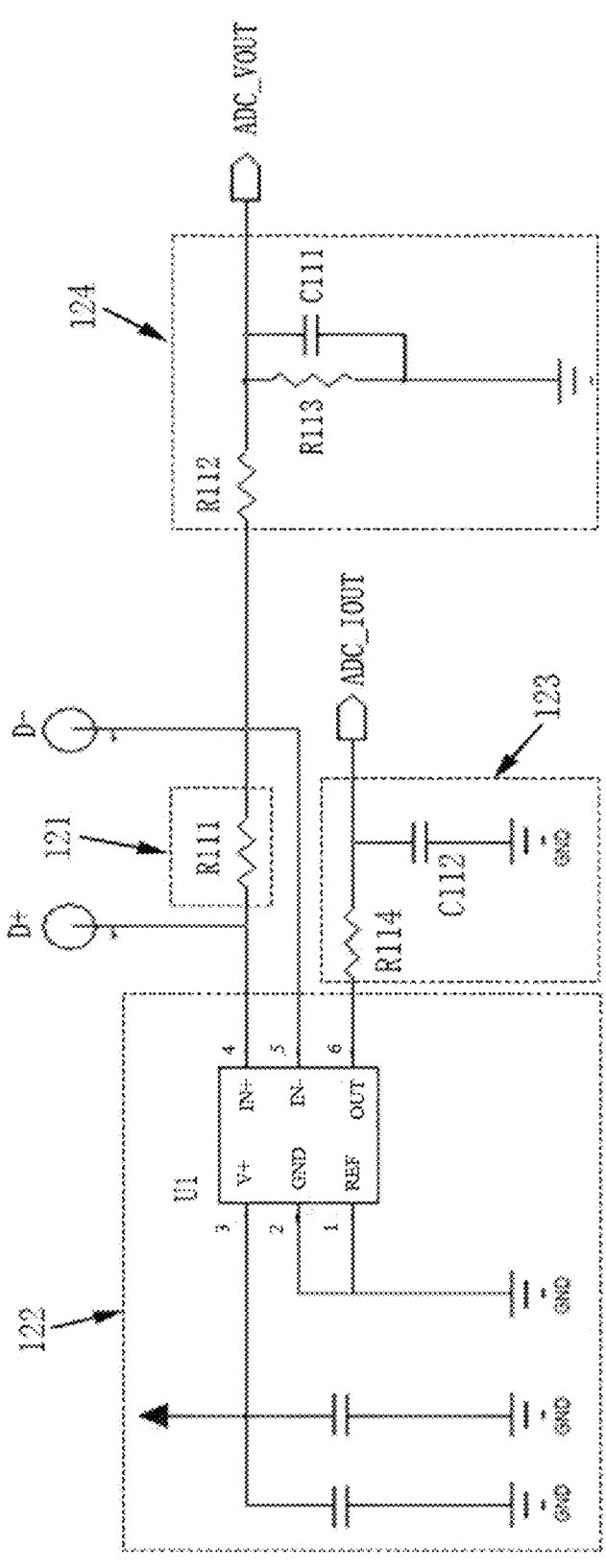
FIG. 6 is a schematic view of a sampling circuit in the smoking set control circuit provided according to the first embodiment of the present application.

Referring to FIG. 6, in an example, both the first electrical parameters and the second electrical parameters comprise current and voltage. Each of the first sampling circuit 12 and the second sampling circuit 14 comprises a first sampling electrical connection terminal D+ and a second sampling electrical connection terminal D−, a sampling resistor 121 (i.e., R111) electrically connected between the first sampling electrical connection terminal D+ and the second sampling electrical connection terminal D−, an operational amplifier 122, and a voltage dividing circuit 124 electrically connected with the second sampling electrical connection terminal D−.

The operational amplifier 122 is configured to amplify and convert the voltage difference between the two ends of the sampling resistor 121, and output a sampling current (shown by ADC_IOUT in the figure).

The voltage dividing circuit 124 is configured to divide the voltage of the second sampling electrical connection terminal D- and output a sampling voltage (shown by ADC_VOUT in the figure).

In this example, the operational amplifier 122 comprises an operational amplifier chip U1 and peripheral circuits thereof. The output terminal ADC_VOUT of the operational amplifier 122 may also be electrically connected with a filter circuit 123, and the filter circuit 123 is configured to filter the sampling current output by the operational amplifier 122. The filter circuit 123 is an RC filter circuit (shown by R114 and C112 in the figure).

In this example, the voltage dividing circuit 124 comprises a first resistor R112 and a second resistor R113 electrically connected in series, and a first capacitor C111 electrically connected at both ends of the second resistor R113 in parallel.

Further speaking, each of the first sampling circuit 12 and the second sampling circuit 14 further comprises a bypass switch (not shown in the figure). The bypass switch is connected in parallel with the sampling resistor 121, and a control terminal of the bypass switch is configured to receive the first control signal output by the microcontroller 15; and the first control signal is used for controlling on and off of the bypass circuit. Through the bypass switch, the sampling resistor may be prevented from being connected in series in the loop all the time (when the bypass circuit is turned on, the power terminal of the operational amplifier 122 may be disconnected from the power circuit), and the circuit loss may be reduced.

The microcontroller 15 is configured to:

control the power tubes in the boost circuit 134 to work at a plurality of different frequencies;

acquire the first electrical parameters and the second electrical parameters at different preset switching frequencies, and accordingly determine corresponding efficiencies of the voltage regulating circuit 13 at different preset switching frequencies;

control the power tube in the boost circuit 134 to take the preset switching frequency corresponding to the highest efficiency among the corresponding efficiencies as the working frequency.

As an example, it is assumed that the switching frequencies of the power tubes are fn~fm, and k switching frequencies, namely f1, f2, f3 . . . fk, are selected from fn~fm. The power tubes in the boost circuit 134 are sequentially controlled to work at different switching frequencies so as to acquire the first electrical parameters and the second electrical parameters at a plurality of different frequencies and determine the efficiency of the voltage regulating circuit 13. For example, when the switching frequency of the power tube is f1, the voltage is U1 and the current is I1 in the first electrical parameters, and the voltage is U2 and the current is I2 in the second electrical parameters, then the efficiency of the voltage regulating circuit 13 is $Q1=P2/P1=(U2*I2)/(U1*I1)$. The efficiency of the voltage regulating circuit 13 corresponding to f1, f2, f3 . . . fk is Q1, Q2, Q3 . . . . Qk.

The preset switching frequencies f1, f2, f3 . . . fk may be optionally set by selecting at equal steps within the switching frequency range fn~fm of the power tube, for example, f1=fn, f2=fn+X, and X is the step for frequency increment.

By finding out the maximum efficiency among Q1, Q2, Q3 . . . Qk (which is assumed to be Qt, then the corresponding switching frequency of the power tube is ft), the power tube in the boost circuit 134 may be controlled to operate at the working frequency of ft. At this working frequency, the loss of the boost circuit 134 is minimal, which improves the utilization rate of power supply.

The working process of the smoking set control circuit of this example will be described with reference to the temperature curve shown in FIG. 7 below.

Figure 7:
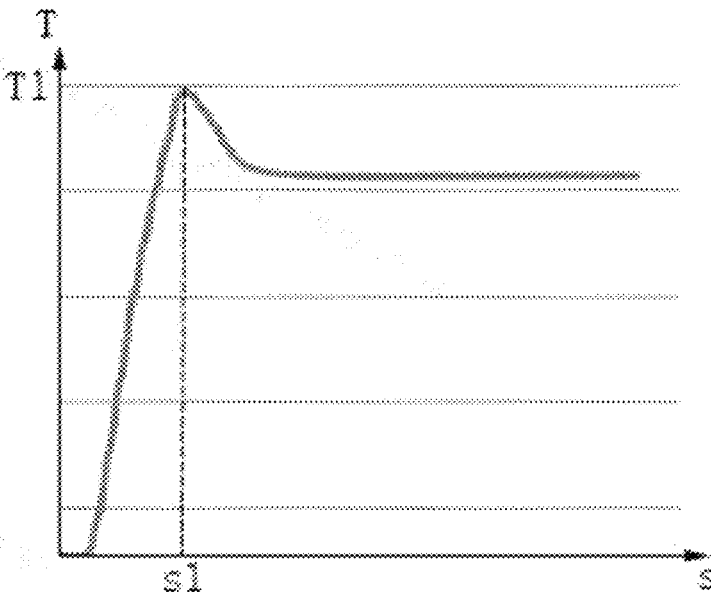
FIG. 7 is a schematic view of the temperature curve provided according to the first embodiment of the present application.

As shown in FIG. 7, when the smoking set is started, the temperature of the heater gradually rises from the initial temperature to the highest temperature T1 (this stage may be called the preheating and heating-up stage). The time consumed by the heating-up phase is S1, which is short and usually several tens of seconds. However, at this stage, the output power is particularly large, the output voltage is high, and the output current is large.

After rising to the highest temperature T1, the temperature of the heater is kept within a certain temperature range or at a preset temperature value (this stage may be called heat preservation stage). The duration of the heat preservation stage is up to several minutes, and at this stage, the output power, output voltage and output current are relatively small.

1). Preheating and Heating-Up Stage

In the preheating and heating-up stage, the microcontroller 15 controls the fourth switch tube Q6 to be turned on through the control signal 10V8_EN, thereby controlling the third switch tube Q5 to be turned on; the power circuit 11 is conductively connected with the integrated chip U5, and the integrated chip U5 is boosted to supply power to the integrated chip U2.

The microcontroller 15 controls the second switch tube Q2 to be turned on through the control signal EN_VCC, thereby controlling the first switch tube Q1 to be turned on. The microcontroller 15 provides driving signals BOOST_PWM_EN (at high level), BOOST_PWM_HI and BOOST_PWM_LI (PWM signals) to the integrated chip U2, so that the integrated chip U2 outputs the driving control signals BOOST_HO and BOOST_LO. The driving control signals BOOST_HO and BOOST_LO control the on and off of the first power tube Q3 and the second power tube Q4 (at this time, the switching frequencies of the first power tube Q3 and the second power tube Q4 are high, e.g., 350 kHz to 450 kHz, which may be determined in the aforementioned way, i.e., by taking the preset switching frequency corresponding to the highest efficiency among the corresponding efficiencies as the working frequency). When the first power tube Q3 is turned on and the second power tube Q4 is turned off, the power circuit 11 charges the inductor L1 through the first switch tube Q1. When the first power tube Q3 is turned off and the second power tube Q4 is turned on, the reverse electromotive force of the inductor L1 is superimposed on the voltage of the power circuit 11, so that a higher voltage is output through the second power tube Q4. Finally, a stable voltage is formed after the voltage is filtered by the filter circuit (filter capacitors C8, C39, C32) and supplied to the heater 16 (V+2, V−2) for heating.

2). Heat Preservation Stage

In the heat preservation stage, the microcontroller 15 controls the fourth switch tube Q6 to be turned on through the control signal 10V8_EN, thereby controlling the third switch tube Q5 to be turned on; the power circuit 11 is conductively connected with the integrated chip U5, and the integrated chip U5 is boosted to supply power to the integrated chip U2.

The microcontroller 15 controls the second switch tube Q2 to be turned on through the control signal EN_VCC, thereby controlling the first switch tube Q1 to be turned on. The microcontroller 15 provides driving signals BOOST_PWM_EN (at high level), BOOST_PWM_HI and BOOST_PWM_LI (PWM signals) to the integrated chip U2, so that the integrated chip U2 outputs the driving control signals BOOST_HO and BOOST_LO. The driving control signals BOOST_HO and BOOST_LO control the on and off of the first power tube Q3 and the second power tube Q4 (at this time, the switching frequencies of the first power tube Q3 and the second power tube Q4 are lower, e.g., 150 kHz to 250 kHz, which may also be determined in the aforementioned way, i.e., by taking the preset switching frequency corresponding to the highest efficiency among the corresponding efficiencies as the working frequency). When the first power tube Q3 is turned on and the second power tube Q4 is turned off, the power circuit 11 charges the inductor L1 through the first switch tube Q1. When the first power tube Q3 is turned off and the second power tube Q4 is turned on, the reverse electromotive force of the inductor L1 is superimposed on the voltage of the power circuit 11, so that a higher voltage is output through the second power tube Q4 (this voltage is lower than the voltage at the preheating and heating-up stage, and the current and output power are relatively low). Finally, a stable voltage is formed after the voltage is filtered by the filter circuit (filter capacitors C8, C39, C32) and supplied to the heater 16 (V+2, V−2) for heating.

Second Embodiment

Figure 8:
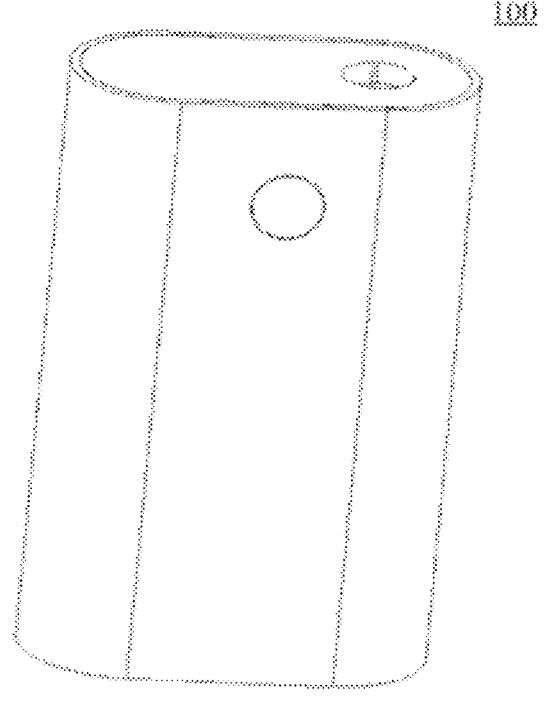
FIG. 8 is a schematic view of a smoking set provided according to a second embodiment of the present applica- tion.

FIG. 8 is a smoking set provided according to the second embodiment of the present application. The smoking set 100 comprises a heater and the smoking set control circuit described in the first embodiment.

The heater may operate at a central heating mode (in which the periphery of a heating body is in direct contact with the aerosol-forming matrix) and a peripheral heating mode (in which a cylindrical heating body wraps the aerosol-forming matrix), and the heater may also heat the aerosol-forming matrix by one or more of heat conduction, electromagnetic induction, chemical reaction, infrared action, resonance, photoelectric conversion and photothermal conversion to generate aerosol for inhalation. Preferably, the heater is an infrared heater.

It shall be noted that, the specification and attached drawings of the present application show preferred embodiments of the present application. However, the present application may be implemented in many different forms, and it is not limited to the embodiments described in this specification. These embodiments are not construed as additional restrictions on the content of the present application, but are provided for a more thorough and comprehensive understanding of the disclosure of the present application. In addition, the above technical features continue to be combined with each other to form various embodiments not listed above, all of which are regarded as within the scope described in the specification of the present application. Further speaking, those of ordinary skill in the art can make improvements or variations according to the above description, and all these improvements and variations shall fall within the scope claimed in the appended claims of the present application.

What is claimed is:

1. A smoking set control circuit, comprising a power circuit, a sampling circuit, a voltage regulating circuit and a microcontroller; wherein the sampling circuit comprises
   a first sampling circuit and a second sampling circuit;
      the first sampling circuit being configured to sample first electrical parameters at a front end of the voltage regulating circuit;
      the voltage regulating circuit comprising power transistors;
   the second sampling circuit being configured to sample second electrical parameters at a back end of the voltage regulating circuit;
   the first electrical parameters and the second electrical parameters comprise current and voltage;
   each of the first sampling circuit and the second sampling circuit comprises a first sampling electrical connection terminal, a second sampling electrical connection terminal, a sampling resistor and an operational amplifier, and a voltage dividing circuit electrically connected with the second sampling electrical connection terminal;
   the sampling resistor is connected between the first sampling electrical connection terminal and the second sampling electrical connection terminal;
   the operational amplifier is configured to amplify and convert the voltage difference between two ends of the sampling resistor and output a sampling current;
   the voltage dividing circuit is configured to divide the voltage of the second sampling electrical connection terminal and output a sampling voltage;

the microcontroller being configured to:

control the power transistors to work at a plurality of different preset switching frequencies;

acquire the first electrical parameters and the second electrical parameters at different preset switching frequencies, and accordingly determine corresponding efficiencies of the voltage regulating circuit at different preset switching frequencies;

control the power transistors to take the preset switching frequency corresponding to the highest efficiency among the corresponding efficiencies as the working frequency.

2. The smoking set control circuit according to claim 1, wherein the first sampling circuit and the second sampling circuit further comprise a filter circuit;

the filter circuit is electrically connected with an output terminal of the operational amplifier, and is configured to filter the sampling current output by the operational amplifier.

3. The smoking set control circuit according to claim 1, wherein the voltage dividing circuit comprises a first resistor and a second resistor electrically connected in series, and a first capacitor electrically connected at both ends of the second resistor in parallel.

4. The smoking set control circuit according to claim 1, wherein the voltage regulating circuit comprises a switch circuit, a power supply circuit, a driving circuit and a boost circuit;

the switch circuit has an input terminal electrically connected with the power circuit, an output terminal electrically connected with a power input terminal of the power supply circuit, and a control terminal for receiving a second control signal output by the microcontroller; the second control signal is configured to control the on and off of the switch circuit;

the power supply circuit has a power output terminal electrically connected with a power terminal of the driving circuit; the power supply circuit is configured to supply power to the driving circuit;

the driving circuit has a signal input terminal for receiving a driving signal provided by the microcontroller, and a signal output terminal which outputs a driving control signal for driving and controlling the power transistors; a signal control terminal for receiving a third control signal output by the microcontroller; and the third control signal is configured to control the on and off of the boost circuit;

the boost circuit is provided with the power transistors; the boost circuit has a power input terminal electrically connected with the power circuit, a power output terminal electrically connected with a heater, a signal receiving terminal for receiving the driving control signal.

5. The smoking set control circuit according to claim 4, wherein the boost circuit comprises a first switch, a second switch, a charging circuit, a first power transistor and a second power transistor;

the first switch has an input terminal electrically connected with the power circuit and an output terminal electrically connected with one end of the charging circuit, the other end of the charging circuit is electrically connected with an input terminal of the first power transistor and an input terminal of the second power transistor, and a control terminal of the first switch is electrically connected with an input terminal of the second switch;

the second switch has an output terminal grounded and a control terminal for receiving the third control signal; the third control signal is configured to control the on and off of the second switch, thereby controlling the on and off of the first switch;

the first power transistor has an output terminal grounded and a control terminal for receiving the first driving control signal output by the driving circuit;

the second power transistor has an output terminal electrically connected with the heater, and a control terminal for receiving the second driving control signal output by the driving circuit.

6. The smoking set control circuit according to claim 5, wherein the charging circuit comprises an inductor.

7. The smoking set control circuit according to claim 5, wherein the first switch is a PMOS transistor, and the second switch, the first power transistor and the second power transistor are all NMOS transistors.

8. The smoking set control circuit according to claim 5, wherein the boost circuit further comprises a filter circuit which is electrically connected between the output terminal of the second power transistor and the heater.

9. The smoking set control circuit according to claim 4, wherein the switch circuit comprises a third switch and a fourth switch;

the third switch has an input terminal electrically connected with the power circuit, an output terminal electrically connected with the power supply circuit, and a control terminal electrically connected with an input terminal of the fourth switch;

the fourth switch has an output terminal grounded and a control terminal for receiving the second control signal; the second control signal is configured to control the on and off of the fourth switch, thereby controlling the on and off of the third switch.

10. The smoking set control circuit according to claim 9, wherein the third switch is a PMOS transistor, and the fourth switch is an NMOS transistor.

11. A smoking set, comprising a heater and the smoking set control circuit according to claim 1.

* * * * *